June 5, 1956   H. W. SOLDNER   2,748,550
CONTAINER COUNTING AND CASING MACHINE
Filed April 27, 1950   3 Sheets-Sheet 1

Inventor
HARLEY W. SOLDNER
By Wheeler, Wheeler + Wheeler
Attorneys

June 5, 1956  H. W. SOLDNER  2,748,550
CONTAINER COUNTING AND CASING MACHINE
Filed April 27, 1950  3 Sheets-Sheet 2

Inventor
HARLEY W. SOLDNER
By
Wheeler, Wheeler & Wheeler
Attorneys

June 5, 1956  H. W. SOLDNER  2,748,550
CONTAINER COUNTING AND CASING MACHINE
Filed April 27, 1950  3 Sheets-Sheet 3

Inventor
HARLEY W. SOLDNER

By Wheeler, Wheeler & Wheeler
Attorneys

United States Patent Office 2,748,550
Patented June 5, 1956

2,748,550
CONTAINER COUNTING AND CASING MACHINE

Harley W. Soldner, Reeseville, Wis., assignor to Brownsville Canning Company, Brownsville, Wis., a corporation of Wisconsin Application April 27, 1950, Serial No. 158,399

15 Claims. (Cl. 53—59)

This invention relates to a container counting and casing machine.

The primary object of the invention is to provide a machine to count and group a preselected number of cans or other containers into position to be encased, and to transfer the encased containers to a delivery conveyor. An important feature of the invention is the provision for keying the counting and grouping operation to the transfer operation, and making both such interlocked operations controllable from a single control, the counting operation ensuing automatically upon completion of the transfer operation.

In this connection it is an object of the invention to provide a machine having a feed conveyor for apportioning the containers into the required number of lanes, an intermittently movable transport platform adjacent the conveyor, indexing means for allowing a specified number of containers to pass from the conveyor to the platform, and means for keying the indexing means to the intermittent operation of the transfer platform.

Other objects will be more apparent to one skilled in the art upon an examination of the following disclosure:

Figure 1:
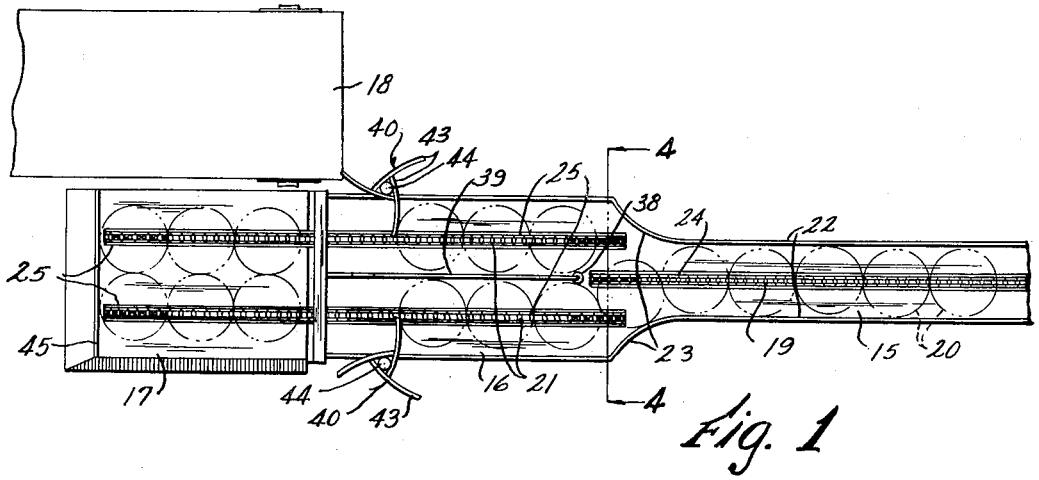
Fig. 1 is a plan view of a machine embodying the invention.
Figure 2:
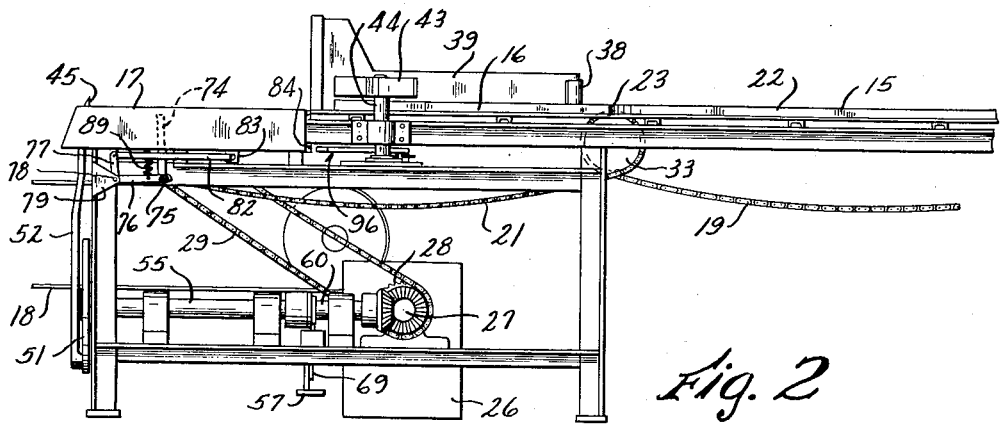
Fig. 2 is a side elevational view of the device of Fig. 1.

In its general organization the machine comprises a container feeding conveyor table 15, an intermediate or container grouping platform 16, which comprises a laterally widened portion of the table 15, a container receiving transfer platform 17, and a delivery conveyor or belt 18. The conveyor table 15, grouping platform 16 and transfer platform 17 have slots 24 and 25 for endless staggered and lapping conveyor chains 19 and 21 which make impositive contact with the bottoms of the containers 20, which are fed thereby along the conveyor table 15 toward the transfer platform.

The tables 15 and 16 are marginally provided with side rails 22 which are oppositely curved at 23 to guide the containers in their dividing course from the conveyor 15 to the grouping platform 16.

Figure 4:
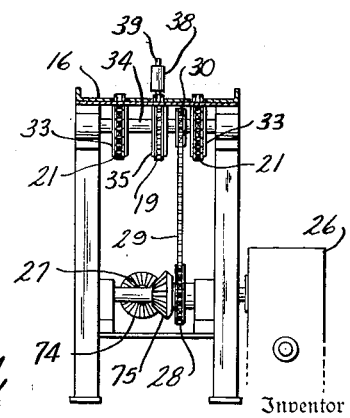
Fig. 4 is a cross section taken along the line 4—4 of Fig. 1 showing the conveyor drive mechanism.
Figure 10:
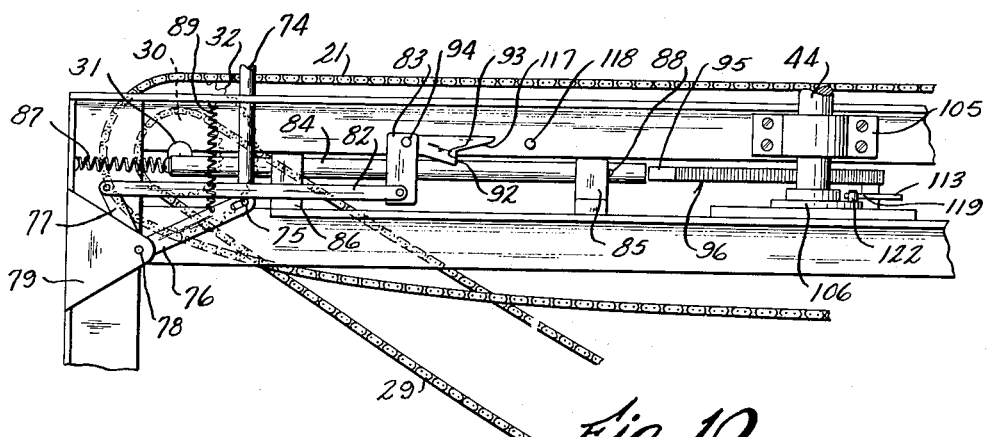
Fig. 10 is a side view of the apparatus shown in Fig. 9.

The respective chains are powered by motor 26 which drives axle 27 and attached sprocket 28, which is in driving connection with drive chain 29. Drive chain 29 is engaged with the sprocket 30 which, as best shown in Fig. 10, is fixed to the same axle 31 upon which conveyor chain drive sprocket 32 is fixed to drive conveyor chains 21. As best shown in Fig. 4 conveyor chains 21 pass over sprockets 33 which are fixed to the common axle 34 with sprocket 35 which drives chain 19.

In operation, the containers or cans 20 are moved along the conveyor table 15 by conveyor chain 19. Near the junction of the tables 15 and 16 the containers are divided into two paths or lanes defined by partition 39 and served by the mutually spaced chains 21. Contact of the containers with the vertical roller 38 disposed at the end of partition 39 effects random division of the containers onto one or the other of the chains 21. There is no set pattern of container distribution between the lanes, this being left purely to chance. The rounded configuration of the cans or other containers, the provision of roller 38, the guiding influence of the side rails 23, and the slight pressure exerted by the conveyor chain 19 is relied upon to fill both lanes before the cans back up onto the conveyor table 15.

As best shown in Fig. 1 the length of the grouping platform 16 is such that random separation of the containers will be effective to dispose three containers at each side of the partition 39 before the containers begin to back into the conveyor table 15. This group of six is suitable for casing large size No. 10 cans; however, any other arrangement of containers in two or more rows could be formed if desired merely by altering the dimensions of the grouping table or adding to the number of lanes into which the feed conveyor divides.

In the selected arrangement, however, the length of the platform 16 is so related to the size of the containers that the last container of the lane first filled projects to deflect succeeding containers around the partition roll 38. In this manner, when either lane is filled, the succeeding containers are fed to the other lane until both are filled.

Continued onward movement of the containers into the intermediate or grouping platform 16 is limited by contact thereof with the spokes 43 of the star wheels 40 which are respectively disposed at each side of the grouping platform. The star wheels are provided with a plurality of generally radial spokes 43 which are successively arcuately movable into the path of can movement on their respective common axles 44. The star wheels function as container stop members and counting devices and are normally restrained from rotation except to permit a measured quantity of cans to move from the grouping platform to the transfer platform in a manner to be hereinafter described.

For the purpose of grouping two lanes of containers three deep the star wheels are respectively provided with three spokes and are so controlled as to be permitted to make a single revolution during each counting cycle. During the course of this single revolution the several spokes 43 freely and successively enter the path of container flow under the pressure of the moving containers powered by the conveyor chains 21. As star wheel rotation is limited to a single revolution during each counting cycle, only three cans on each side of the separator 39 will pass from the grouping platform to the transfer platform. At the completion of the counting cycle, star wheel rotation will be interrupted with a spoke of each wheel extending laterally into the path of container movement. Consequently, only the desired measured number of containers will pass to the transfer platform and the extended spokes then function as stops against which the containers will assemble into the desired grouping determined by the number of lanes and table dimensions. The impositive contact between the conveyor chains and the container bottoms permits the chains to freely slide under the containers when container movement is arrested by the star wheel stop members.

The number of containers passed by the star wheels is determined by the number of revolutions the wheels are permitted to rotate, and by the number of star wheel spokes. It is readily understood that the quantity of containers passed in any counting cycle may be adjusted by varying the number of spokes carried by each wheel, and by the number of revolutions permitted the wheels.

Figure 5:
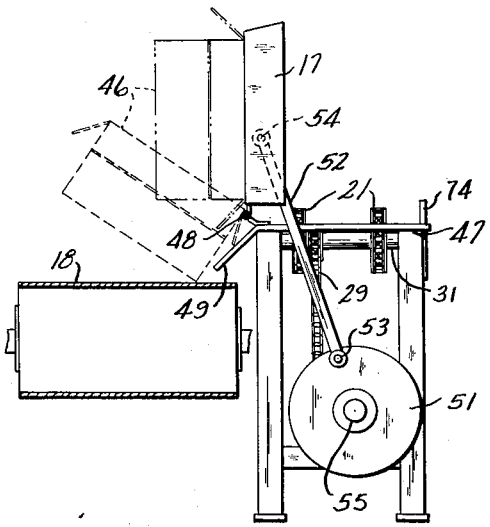
Fig. 5 is an end elevation of the machine showing the tiltable transfer platform in the course of its movement from container receiving position to case depositing position.
Figure 6:
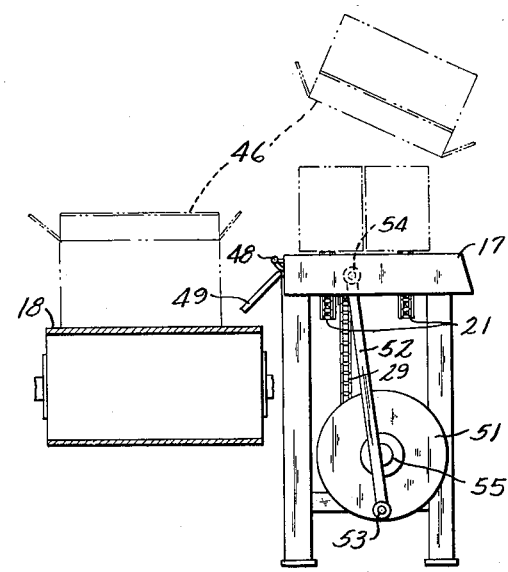
Fig. 6 is a like end elevation showing the case transfer platform in container receiving position.

Movement of the measured group of containers from the assembly platform 16 to the transfer platform 17 is ultimately arrested by contact of the leading containers with the transverse stop rail 45 at the end of the platform 17. With the grouped containers in this position it is possible, as best shown in Figs. 5 and 6, to package the containers with a cardboard case 46 or the like. The inverted case 46 is manually dropped over the grouped containers. Platform 17 is tiltably mounted on the table frame, indicated generally as 47, on a corner pivot 48 which permits the platform to pivot on an axis parallel with the conveyor slots 25. The platform is tiltable on the pivot from container receiving position shown in Fig. 6 to a case depositing upended position shown in Fig. 5. Frame 47 is further provided with a downturned lip or guide 49 which guides the case 46 during the process of its inversion and transfer from the tiltable platform 17 to a right side up position on the delivery conveyor 18. By disposing the tilting axis of the platform parallel with the slots 25 the platform may be freely tilted between container receiving and case depositing position without interference by the conveyor chains 25, the chains and slots being brought into automatic registry when the platform is returned to container receiving position.

Figure 7:
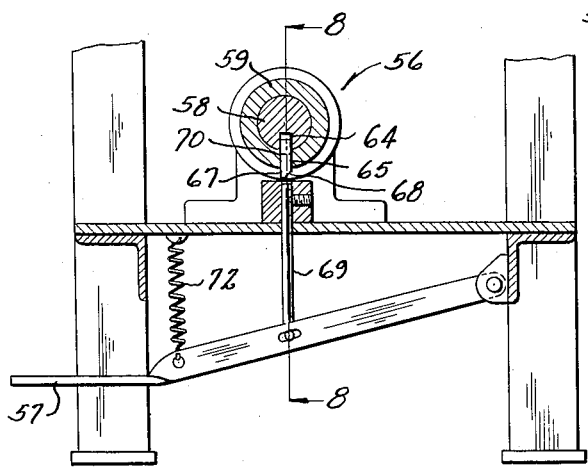
Fig. 7 is a transverse cross section through a special type of clutch used to control the tilting of the transfer platform, a portion of the lower frame of the machine upon which it is mounted being also illustrated.
Figure 8:
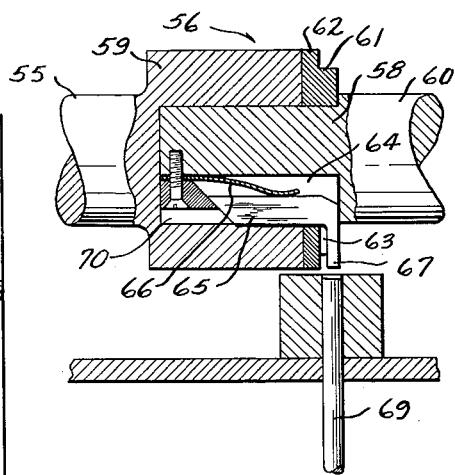
Fig. 8 is an axial cross section through the clutch taken along the line 8—8 of Fig. 7.

The platform 17 is made to tilt in the aforedescribed transfer cycle by means of a power operated crank and fly wheel 51 which is pinned at 53 to a motion transmitting lever 52. Lever 52 is pinned at 54 to the platform 17. The crank 51 and lever 52 are so related that a single complete revolution of the crank 51 on its shaft 55 will be effective to move the platform 17 through its transfer cycle from container receiving position to case discharge position and back to container receiving position. The transfer cycle is preferably controlled by an operator who manually initiates the single revolution of the crank 51 by means of a conventional one revolution clutch indicated generally in Figs. 7 and 8 as 56.

The details of the clutch 56 comprise no part of the present invention, and any of a variety of types adapted for this purpose may be substituted for the clutch to be described. The clutch includes a constantly turning part 58, which receives power from an integral shaft 60 which mounts the bevel gear 74 meshing with gear 75 from the motor 26, and an intermittently turning part 59 which is connected to the crank shaft 55.

The intermittently turning part 59 is socketed to axially receive the constantly turning part 58 and is axially positioned by abutment with an end ring 62 which turns with part 58 and has a peripheral corner groove 61 in which the top end of a trip rod 69 normally rides. The constantly turning part 58 and intermittently turning part 59 are respectively provided with axially extending slots 64 and 70 which radially align in one relative position of the parts. The end ring 62 is also relieved at 63 to align with slot 64. The respective parts may be selectively keyed to rotate together by a movable key 65 which is slidable in the respective slots 64 and 70 and is biased by a spring 66 into an interlocked position to span the junction of the respective slots to key the parts.

Key 65 carries an actuating member 67 which projects through the aligned slot 64 and relieved portion 63 of the end ring and is provided with an end bevel 68. When the slots 64 and 70 are out of register the key 65 is withdrawn within slot 64 and the beveled top 68 of the key actuator 67 is within the groove 61 of end ring 62. Trip rod 69 is normally biased by spring 72 against the groove face 61. At the precise moment in clutch revolution when the respective slots 64 and 70 are aligned rod 69 contacts the key actuator tip 68 to prevent the bias spring 66 from forcing the key 65 to parts interlocking position. Consequently, for as long as rod 69 is permitted to ride against end ring groove 61 the clutch will run free and no power will be transmitted. However, if foot pedal 57 is depressed, rod 69 will be withdrawn from the path of the key actuator so that upon registration of the slots 64 and 70 the key will be snapped by spring 66 into interlocking position and the clutch will transmit power to the crank shaft 55. Release of foot pedal 57 will return rod 69 into the circular path of the key actuator so as to cam the key to retracted position when its beveled tip 68 next rides over the rod end. In this manner the clutch transmits turning torque only as desired and for but a single revolution of the parts, unless, of course the operator maintains the foot pedal depressed in which case the clutch parts remain engaged. If the operator, however, releases the lever 57 immediately upon depressing it to engage the interlock, the spring 72 will bias the rod 69 to upstanding position to disengage the key upon the next succeeding revolution of the parts and thus the clutch will run free until the operator again depresses the foot lever 57.

Figure 3:
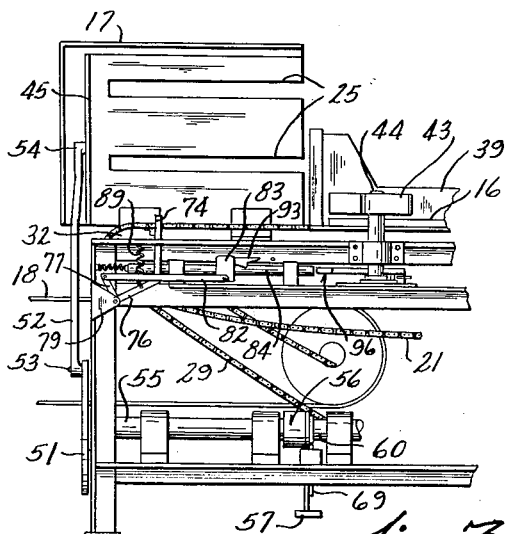
Fig. 3 is an enlarged side elevational view of a portion of the machine shown in Fig. 2 showing the case transport platform tilted upwardly in the course of discharging the encased containers to an adjacent removal conveyor.
Figure 9:
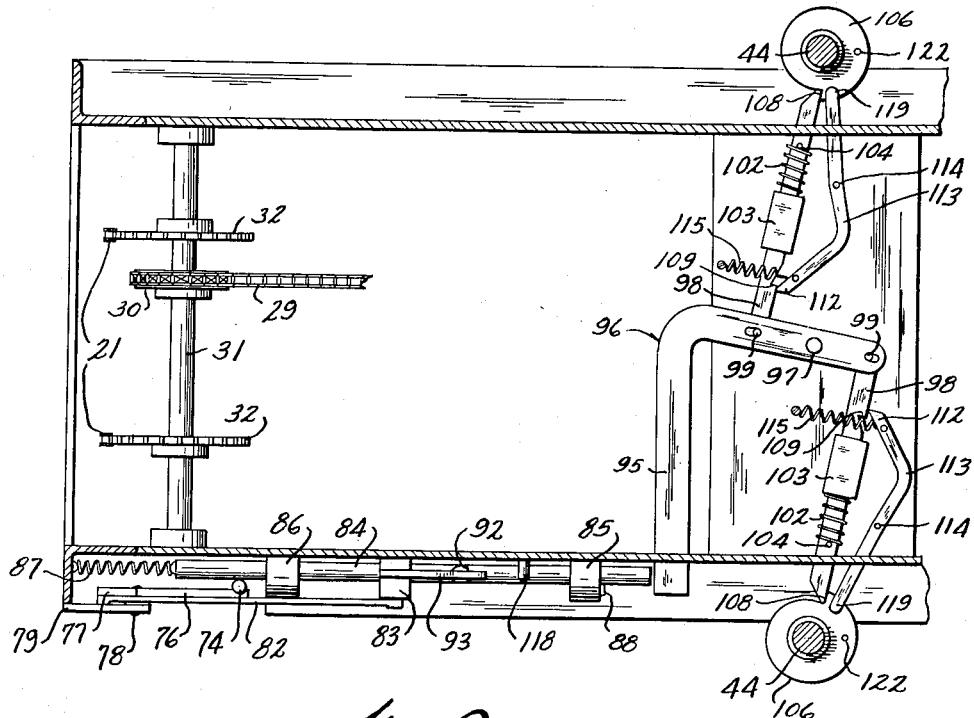
Fig. 9 is a plan view of the apparatus used to measure the number of containers moving from the feed conveyor to the transfer platform, and the control means keying the measuring apparatus to the intermittent operation of the platform, the table top being removed to expose details of construction.

An important feature of the present invention is the interlock structure which keys the counting cycle of the star wheels to the transfer cycle of the tiltable platform 17. As is best shown in Figs. 3, 9 and 10, tiltable platform 17 engages upstanding actuating or push rod 74 which is depressed when the platform is in container receiving position, and released when the platform is in case discharging position. When push rod 74 is depressed the counting cycle of the star wheels is started through an escapement mechanism initially responsive to push rod movement and which continues thereafter independently of push rod manipulation.

The actuating rod 74 is pivotally connected at 75 to arm 76 of a bell crank having a second arm 77. The bell crank arms are mutually pivoted at 73 to a bracket 79 secured to the machine frame. The bell crank transmits motion received from the rod 74 to link 82 which terminates in a collar 83 slidable on the plunger 84 which supports the collar and which is in turn supported in bearings 85 and 86. Plunger 84 is free to reciprocate in its bearings 85 and 86 but is biased by a tension spring 87 to rearward position defined by the abutment of transverse pin 88 against bearing 85. The link 82 is likewise biased to withdrawn or rearward position by the tension spring 89 acting through the bell crank. In this position a gravity biased catch 93 pivoted to the collar at 94 engages a notch 92 of the plunger 84 preparatory to transmitting motion from the actuating rod 74 to the plunger 84.

Downward pressure on the push rod 74 will be transmitted through the aforedescribed linkage system to move the plunger 84 to the right at it appears on Figs. 9 and 10, and against the bias of the spring 87. Arm 95 of bell crank 96 is disposed in the path of movement of plunger 84 to be engaged thereby and is pivoted on its mounting pin 97. The bell crank 96 is pivotally connected at 99 at opposite sides of the bell crank pivot 97 to paired detent stems 98 which are reciprocally mounted in sleeves 103.

The respective star wheel axles 44 are rotatably mounted at each side of the grouping platform 16 in brackets 105. An escapement mechanism which governs the movement of the star wheels in their counting cycle comprises spiral cams 106 fixed at the lower ends of each star wheel axle 44. A cam shoulder or stop 108 is formed where the laterally offset cam portions overlap and are interconnected. The cam shoulders 108 face in the direction of star wheel rotation and normally seat against the ends of the detent stems 98. In this manner rotation of the star wheels is normally restrained. Actuation of the bell crank 96, however, will withdraw the stems from the cam shoulders against the bias of the springs 102, which act between the pin 104 and sleeve 103, to permit the star wheels to freely rotate.

The stems 98 are further provided with cocking apparatus to hold the stems withdrawn against the bias of springs 102 and after plunger 84 is withdrawn from contact with bell crank arm 95. Plunger withdrawal occurs immediately after the stems are cocked. Pivoted catch 93 is provided with a cam surface 117 which rides over the transverse pin 118 to withdraw the catch from the plunger notch 92 and permit tension spring 87 to bias the plunger rearwardly and out of contact with the cocked bell crank arm 95. In this manner the escapement mechanism will function to carry out the counting cycle of the star wheels without interference by the plunger 84 and independent of push rod manipulation. The cocking apparatus is desirable as otherise the stems 98 might return under bias of springs 102 behind cam shoulders 108 before the pressure of the containers turns the star wheels.

For stem cocking purposes triggers 113 are provided each having an end catch 112 which engage a stem notch 109 when aligned therewith. Springs 115 bias the catch ends 112 into notch engagement. The triggers 113 are centrally pivoted on the pins 114 and are provided with trip ends 119 which are disposed in the arcuate path of cam pins 122. The cam pins actuate the trigger to withdraw the trigger catch 112 from the stem notch 109 to release the detent stems which are then urged by the springs 102 into pressured engagement with the cam surface. Continued rotation of the cam will bring the stem ends into ultimate engagement with the cam shoulder 108 to interrupt star wheel rotation after a single revolution thereof, and until the stems 98 are again cocked. The cam pins 122 are arcuately offset from the stops 108 to permit container movement to force the star wheels and cams partially through the counting cycle before the stems are released. In this manner only the number of containers determined by the number of spokes on the star wheels are permitted to pass from the grouping table to the transfer platform 17, the succeeding containers being arrested by the stationary star wheel.

The aforedescribed linkage system, escapement mechanism, and cocking apparatus interrelates or keys the counting cycle of the star wheels 40 to the movements of the case transfer platform 17. The star wheels are restrained from rotation at all times except when the detent stems 98 are withdrawn from cam shoulder contact by depression of push rod 74, which sets the cocking apparatus and initiates escapement movement. Container counting thereafter proceeds automatically for a complete cycle and will not re-occur until the tilting platform completes its transfer cycle and is returned to container receiving position.

The transfer cycle and related counting cycle is entirely controlled by the operator who initiates the transfer cycle and next succeeding measuring cycle by simply depressing foot lever 57. The only manual operation is that of placing the inverted case 46 about the grouped containers and depressing foot lever 57; the grouping of the containers, counting of the containers onto the transfer platform, and transfer of the encased containers to the delivery conveyor proceeding automatically.

I claim:

1. In a container counting and casing machine the combination with a container feeding conveyor and a container receiving platform, of apparatus for counting containers from the feeding conveyor to the receiving platform, said counting apparatus comprising a container stop extending into the path of container flow, said stop being movable into and out of said container path, and an escapement mechanism having a container counting cycle of operation responsive to container flow to move said stop into said container path upon completion of the cycle, said receiving platform being movable through a transfer cycle including container receiving position and container depositing position, said machine being further provided with motion transmitting connections between said platform and escapement mechanism, said connections providing means directly actuated by the platform in its movement toward container receiving position for initiating escapement mechanism operation through the container counting cycle.

2. In a container casing machine the combination with a container feeding conveyor and a case removing conveyor, of a container receiving and casing platform intermediate said conveyors and upon which inverted cases are placed over groups of containers, said platform being aligned with said container feeding conveyor whereby to receive containers on an extension of their path of movement on said container feeding conveyor, said platform having a mounting, a pivot on the mounting to which the platform is hinged, and means for pivoting the platform upon the pivot hinge in a cycle to invert and transfer containers fed to said platform from one conveyor to the other.

3. In a container casing machine the combination with a container feeding conveyor and a case removing conveyor, of a container receiving and casing platform intermediate said conveyors and upon which inverted cases are placed over groups of containers, said platform having a mounting, a pivot on the mounting to which the platform is hinged, and means for pivoting the platform upon the pivot hinge in a cycle to invert and transfer containers fed to said platform from one conveyor to the other, the means for pivoting the platform comprising a power source, a clutch, motion transmitting connections between the clutch and the platform, and a control for said clutch, said control comprising means for initiating intermittent motion of the clutch in one complete cycle of pivotal transfer movement of the platform from container receiving position to case depositing position and back to container receiving position.

4. In a container counting and casing machine, the combination with a container feeding conveyor, a container grouping platform, and a container receiving platform, of apparatus for the random separation of the container into a plurality of lanes on the grouping platform from the feed conveyor, and means for counting and passing a plurality of containers in each lane to the receiving platform to dispose said containers in a group comprising at least two lanes with at least two containers in each lane, said counting means comprising a stop disposed in each of said lanes, said stops being mounted for movement into and out of the path of container movement, and an escapement mechanism controlling said stop movement in accordance with a selected counting cycle.

5. The device of claim 4 wherein the respective stops comprise a plurality of spokes mounted upon a common axle to move on a circular path into and out of the container path, said escapement mechanism comprising a stop on the axle and a detent retractably movable into engagement with the axle stop.

6. The device of claim 5 in further combination with cocking apparatus, said apparatus comprising means for retracting the detent, a trigger engageable with the detent in its retracted position, said trigger having a part adapted to be tripped upon rotation of the axle to release the detent.

7. In a container counting and casing machine the combination with a container feed conveyor, a container receiving platform, means between said conveyor and platform for the indexed advancement of a counted number of containers from the conveyor to the platform and first means keyed to said indexing means for interrupting container flow after a predetermined plurality of containers have passed said indexing means, of means for cyclically bodily transferring said receiving platform from container receiving position to an inclined position where the containers are delivered by gravity to an adjacent delivery conveyor and returning the platform to container receiving position, said indexing means having a cycle of operation and second means keying said indexing means and its cycle of operation to the transfer cycle of the platform.

8. In a container counting and casing machine the combination with a container feed conveyor, a container receiving platform, means between said conveyor and platform for the indexed advancement of a counted number of containers from the conveyor to the platform and first means keyed to said indexing means for interrupting container flow after a predetermined plurality of containers have passed said indexing means, of means for cyclically bodily transferring said receiving platform from container receiving position to an inclined position where the containers are delivered by gravity to an adjacent delivery conveyor and returning the platform to container receiving position, said indexing means having a cycle of operation keyed to the transfer cycle of the platform, a push rod disposed in the path of platform movement to be actuated thereby, a star wheel provided with an axle and with a plurality of stop members on the axle movable into and out of the path of container advance, an escapement mechanism in connection with the wheel to regulate its rotation in a determined cycle, and motion transmitting connections between the push rod and escapement mechanism keying the escapement cycle to push rod actuation.

9. The device of claim 8 wherein the motion transmitting connections include a releasable connection between the push rod and escapement mechanism, said device being further provided with cocking apparatus for setting the escapement mechanism, said releasable connection being engaged during push rod actuation to cock the cocking apparatus and being released thereafter to permit operations of the escapement mechanism independently of further push rod actuation.

10. In a device of the character described, an escapement mechanism having a unidirectional cyclic movement for controlling the indexing movement of a container measuring device including an axle, said mechanism comprising a spiral cam on the axle, said cam being provided with a shoulder, a detent removably positioned in the path of cam rotation to seat against the cam shoulder, means for withdrawing the detent from the shoulder to initiate escapement cyclic movement, and means for returning the detent into the path of cam shoulder movement to interrupt axle movement at the end of the escapement cycle, and cocking apparatus for holding the detent withdrawn for a predetermined arc of axle rotation, said cocking apparatus including a trigger having a portion engaged with the detent in its withdrawn position, and a trigger release pin on the cam and arcuately offset from the cam shoulder, said trigger having a trip portion disposed in the path of release pin movement whereby to release the detent during movement of the cam.

11. In the device of the character described container measuring apparatus comprising an indexing star wheel having an axle and a shouldered spiral cam upon the axle, a spring biased detent normally pressed by said spring against said cam to engage the cam shoulder; an actuating rod, motion transmitting connection between the actuating rod and the detent to withdraw the detent from cam shoulder engagement, and means independent of said rod and said motion transmitting connections for holding the withdrawn detent out of engagement with the cam surface, said means comprising a trigger having a catch portion engageable with the withdrawn detent and a trip portion disposed adjacent said cam, said cam being provided with a release pin engageable with the trip portion of the trigger to disengage the trigger catch from said detent upon rotation of the cam to contact said pin against said trigger trip.

12. The device of claim 11 wherein the motion transmitting connections comprise a connective link pivotally attached to the detent, a separate link connected with the actuating rod and an intermediate plunger, said plunger and separate link having interengaging parts whereby motion is transmitted from the actuating rod to the detent, said interengaging parts including a catch on the separate link having a cam surface whereby to withdraw said catch from interengagement with said plunger after a predetermined movement thereof, said plunger having a spring acting against the movement of said plunger to withdraw said plunger from contact with said detent link upon cammed withdrawal of said catch from the plunger.

13. A device for the random separation of containers comprising the combination with a container feed table and a container grouping table, said feed table being provided with an impositive conveyor upon which containers are transported toward the grouping table, said grouping table being provided at both sides of said feed conveyor with an impositive conveyor laterally offset from said feed conveyor to receive containers therefrom, of a separator on said grouping table between said receiving conveyors and in substantial alignment with the feed conveyor, and stop means at the end of the grouping table against which the separated containers collect upon the receiving conveyors, said separator comprising an upstanding roller, said grouping table being of such length from the stop means to the roller than the container stopped adjacent to the roller projects into the path of succeeding containers to divert such containers about said roller.

14. In a container casing device having conveyors for transporting the containers, a tilting container receiving platform having a pivotal mounting upon which the platform is tiltable between container receiving and upended container depositing positions, said platform being provided with slots registering with said conveyors when the platform is in container receiving position, said platform pivot being substantially parallel to and laterally offset from said slots.

15. In a container casing machine the combination with a container feeding conveyor and an encased container removing conveyor, of a container receiving and casing platform intermediate said conveyors and upon which inverted cases are placed over groups of containers, of means on the container feeding conveyor for grouping said containers into adjacent lanes with a plurality of containers in each lane, said means including means for releasing a predetermined number of containers in each said lane to pass said containers in said group from said container feeding conveyor to said casing platform, said platform being provided with a mounting on which it is pivotal in a transfer cycle between container receiving position and an inclined position in which encased containers are gravity fed to said case removing conveyor, said platform being provided with power means and control means for actuating said platform through one transfer cycle from container receiving position to inclined position and back to container receiving position, said means on the container feeding conveyor for feeding containers to said platform being keyed to one complete transfer cycle of the platform whereby to feed said containers to the platform when it is in container receiving position and to interrupt such feed during the transfer cycle and until the platform completes its transfer cycle and returns to container receiving position.

References Cited in the file of this patent

UNITED STATES PATENTS

| | | | |
|---|---|---|---|
| 1,243,406 | Hawthorne | Oct. 16, | 1917 |
| 1,284,781 | Rogers | Nov. 12, | 1918 |
| 1,422,229 | Sharp | July 11, | 1922 |
| 1,660,956 | Eppler | Feb. 28, | 1928 |
| 1,836,838 | Coldwell | Dec. 15, | 1931 |
| 2,036,421 | Luckie | Apr. 7, | 1936 |
| 2,094,753 | Ryan et al. | Oct. 5, | 1937 |
| 2,109,294 | Kimball et al. | Feb. 22, | 1938 |
| 2,341,128 | Titus et al. | Feb. 8, | 1944 |
| 2,431,265 | Madsen et al. | Nov. 18, | 1947 |
| 2,467,679 | Lyon | Apr. 19, | 1949 |
| 2,514,190 | Schlichter et al. | July 4, | 1950 |
| 2,536,249 | Archer | Jan. 2, | 1951 |
| 2,556,082 | Hartness | June 5, | 1951 |
| 2,692,713 | Silva | Oct. 26, | 1954 |